June 11, 1946.  L. D. CAHILL ET AL  2,401,907
DYNAMIC CLUTCH TORQUE RECORDER
Filed April 12, 1944  4 Sheets-Sheet 3
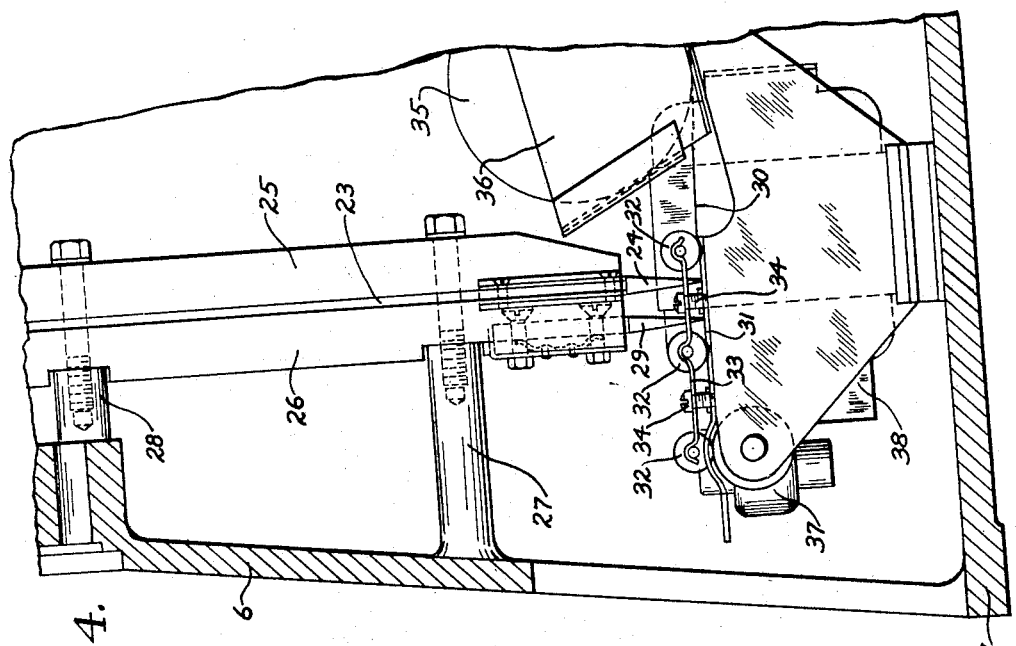
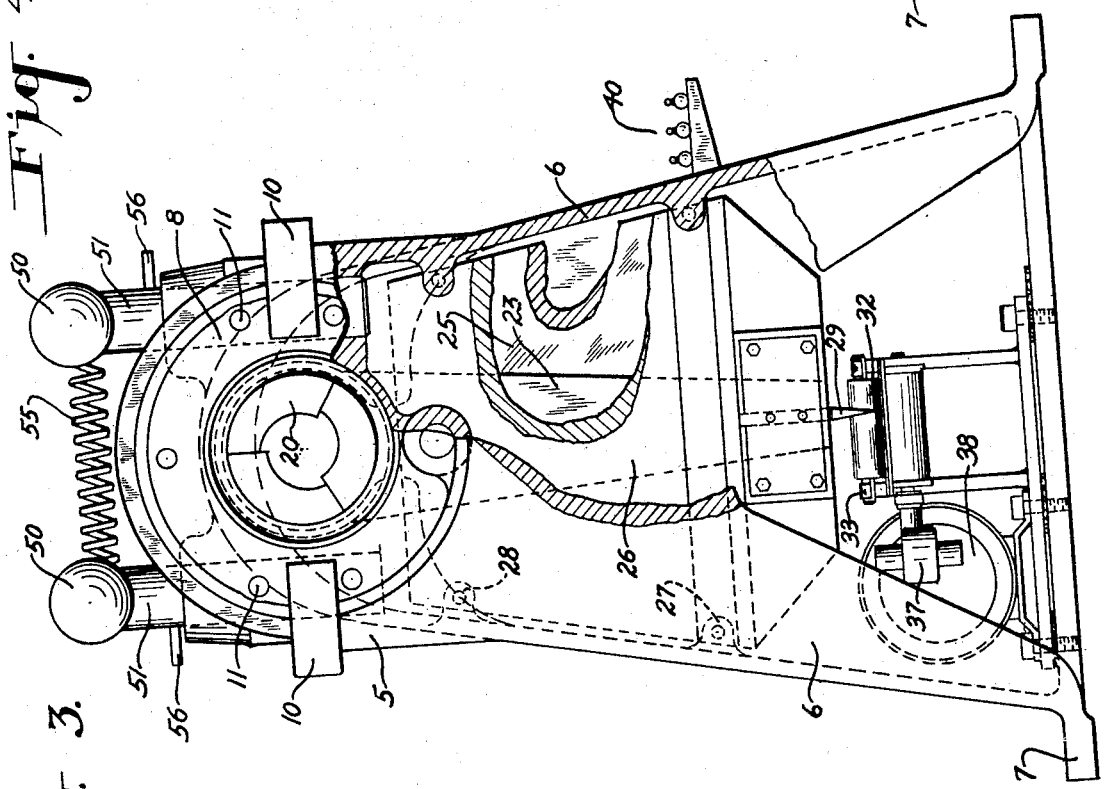
INVENTOR.
LYSLE D. CAHILL
JOSEPH J. NEFF
BY FORREST A. FRAMPTON
ATTORNEY June 11, 1946.　　L. D. CAHILL ET AL　　2,401,907
DYNAMIC CLUTCH TORQUE RECORDER
Filed April 12, 1944　　4 Sheets-Sheet 4

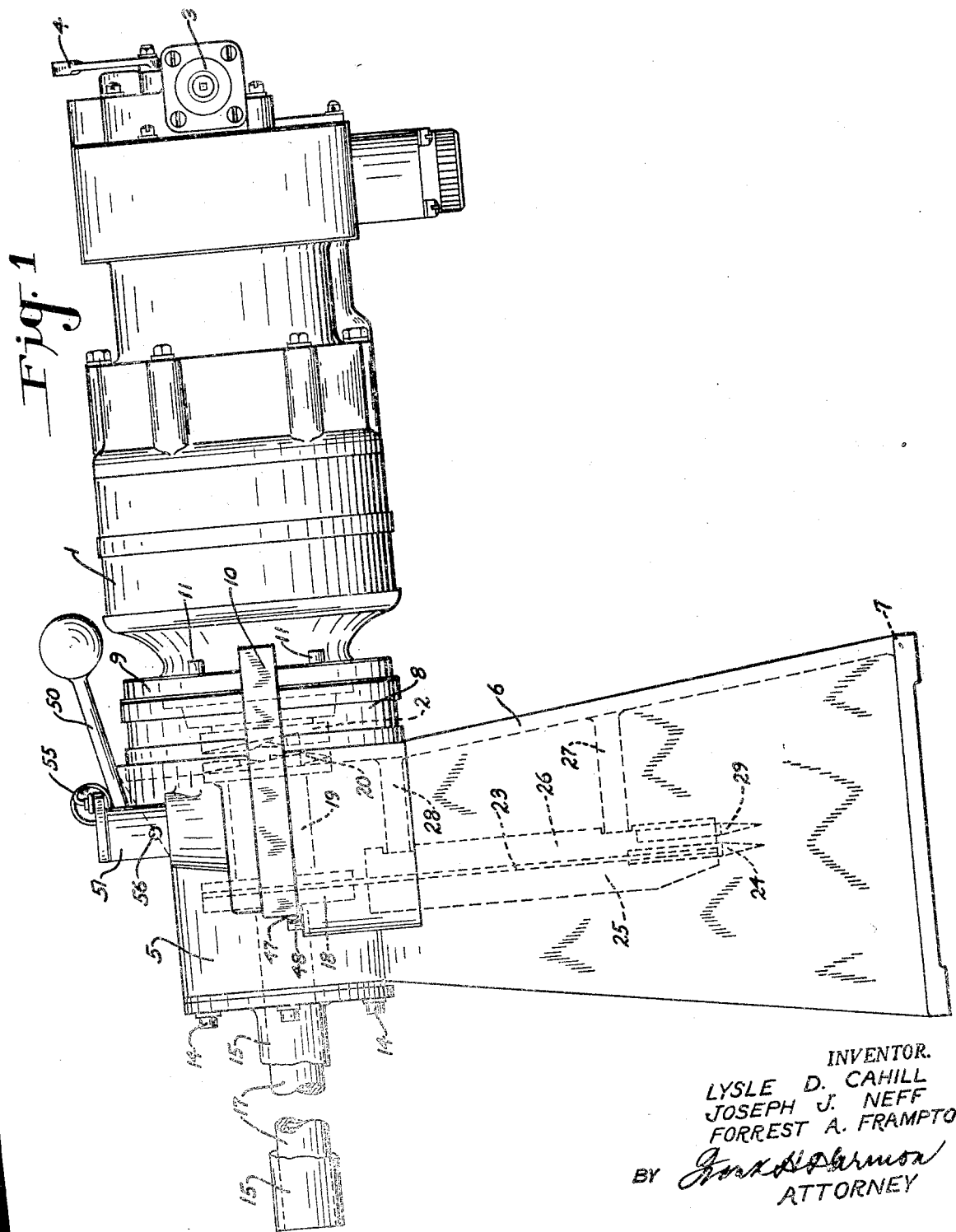

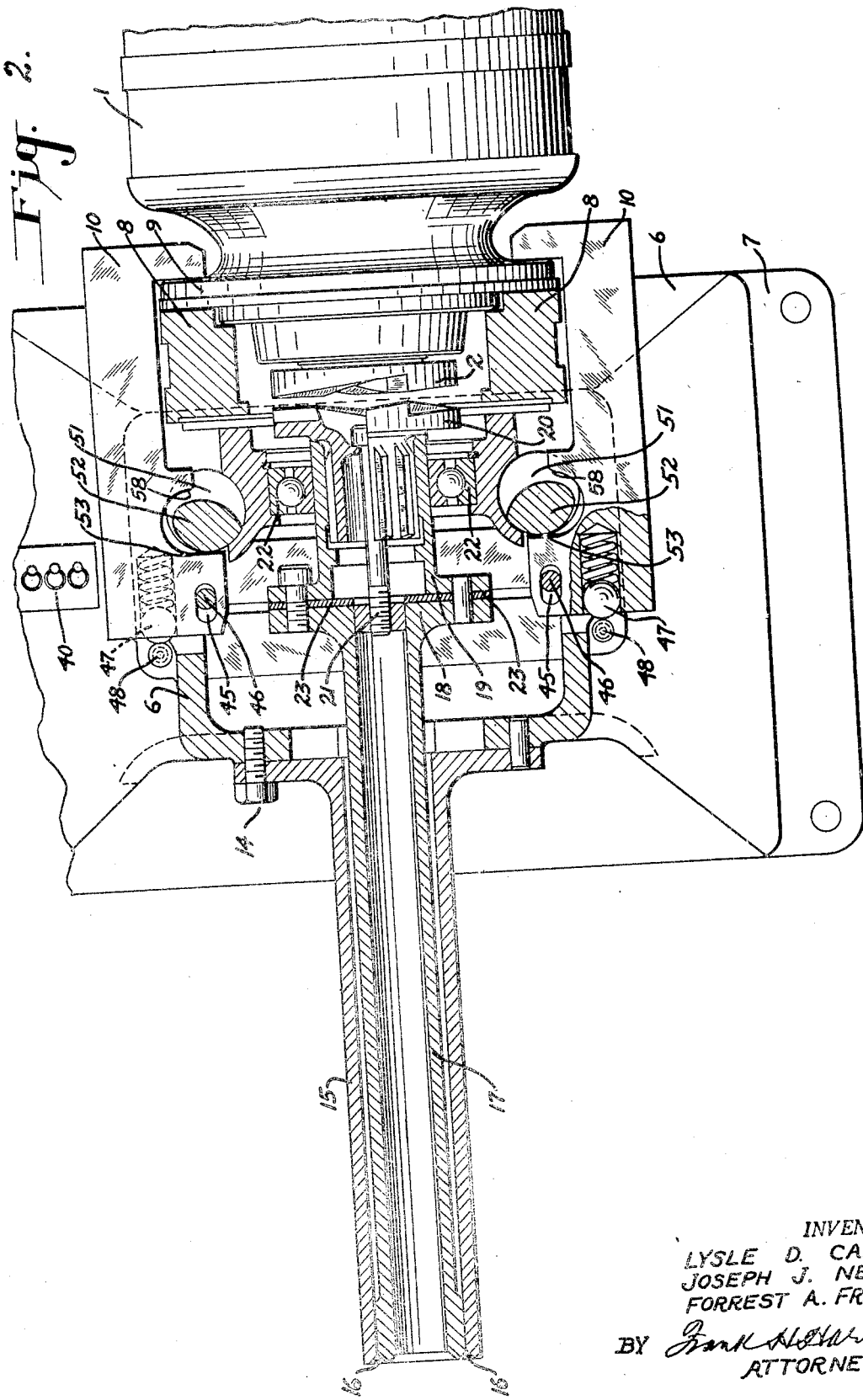

INVENTOR.
LYSLE D. CAHILL
JOSEPH J. NEFF
FORREST A. FRAMPTON
BY Frank A. Harmon
ATTORNEY Patented June 11, 1946

2,401,907

UNITED STATES PATENT OFFICE 2,401,907

DYNAMIC CLUTCH TORQUE RECORDER

Lysle D. Cahill, Shaker Heights, Joseph J. Neff, South Euclid, and Forrest A. Frampton, Garfield Heights, Ohio, assignors, by mesne assignments, to Jack & Heintz Precision Industries, Inc., Cleveland, Ohio, a corporation of Delaware Application April 12, 1944, Serial No. 530,600

8 Claims. (Cl. 73—118)

This invention relates to a device for recording clutch torque characteristics and has particular application to aircraft starters and the like. The object of the invention is to provide a frequency responsive dynamic clutch torque recorder which will make a complete and accurate record of instantaneous torque values plotted against time.

Aircraft starters for large airplane engines exert a cranking torque through the sudden release of energy stored in a rapidly revolving flywheel contained within the starter. In starting an aircraft engine the flywheel is first energized by an electric motor or hand crank mechanism to impart a high rotational speed thereto. When the desired rotational speed has been obtained, a jaw on the starter is extended into positive engagement with a co-mating jaw on the engine to be started so that the two are immediately positively locked together. A multiple disc clutch is ordinarily provided in the starter reduction gearing to allow a certain amount of slippage until the engine has been accelerated to cranking speed, and the device of the present invention is designed to test the operation of such a clutch in what is termed locked jaw performance. That is to say that the flywheel in the starter is energized to its normal cranking speed and then the starter jaw is extended into engagement with a mating jaw which is positively restrained against rotation, to simulate the conditions encountered in attempting to crank a stiff or "frozen" engine.

An ideal clutch in slipping under load would transmit a substantially steady, non-fluctuating torque until the flywheel energy was nearly dissipated, whereupon the torque, if plotted against time, would gradually fall to zero in a smooth curve. In practice, however, clutches often exhibit an undesirable tendency to chatter, or vibrate, with rapid fluctuations occurring in the value of torque. When such a condition obtains, conventional devices which indicate only average torque values are obviously inadequate to present a true picture of performance. For instance, the average value may be satisfactory although instantaneous values may vary from practically zero to twice average value, producing a vibration condition which may be highly objectionable. It is therefore the object of the present invention to provide a testing device sufficiently sensitive and responsive to instantaneous values to indicate the amplitude and frequency of such vibrations in the manner of an oscillogram.

It is to be understood, of course, that the invention may be used to test other types of clutches and torque transmitting mechanisms, but for purposes of illustrating the principles of the invention, the prefered embodiment herein shown and described relates to starters for aircraft engines and the like.

In the drawings:

Figure 1 is a view of a preferred embodiment of the invention in side elevation;

Figure 2 is a top plan view with certain parts shown in section;

Figure 3 is an end elevation view with parts broken away;

Figure 4 is a fragmentary side elevation with the casing shown in section, looking from the side opposite that shown in Figure 1;

Figure 5:
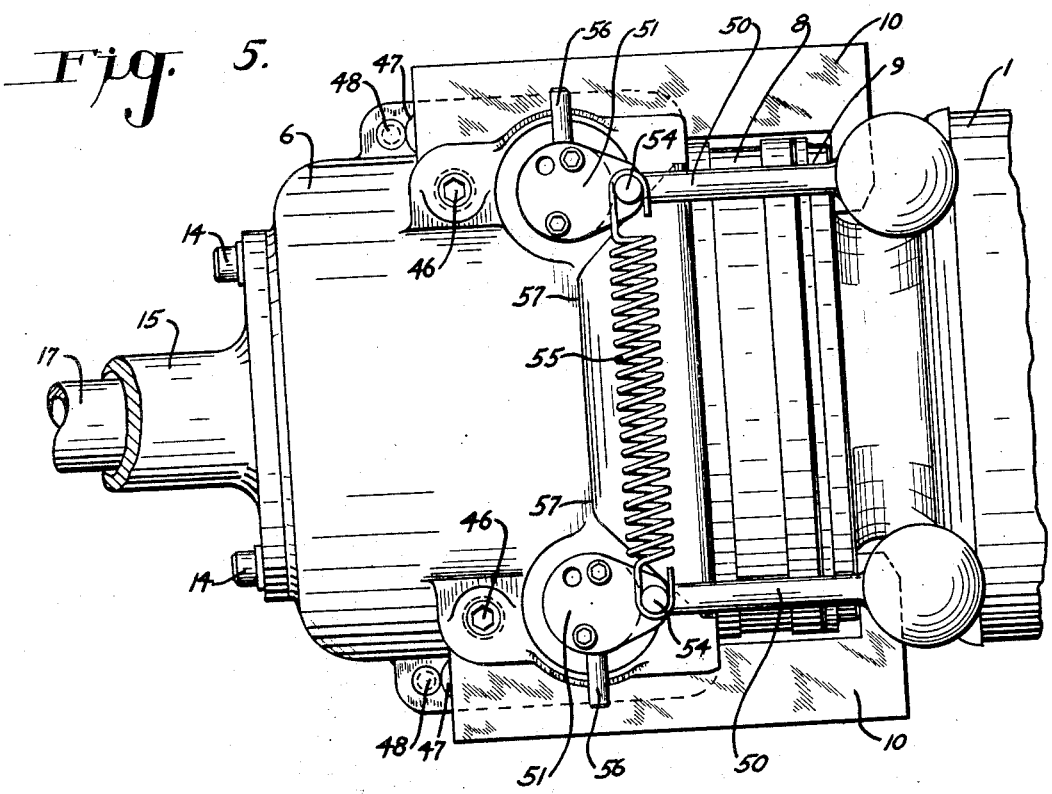
Figure 5 is a fragmentary top plan view showing the starter clamps in locked position.

Referring now to the drawings, the numeral 1 designates an aircraft starter containing an electric motor, inertia flywheel, reduction gearing, multiple disc clutch, and extensible jaw. These various components are housed within the starter casing, only the jaw 2 appearing in the drawings. The particular starter illustrated may be energized alternatively by the above mentioned electric motor or by a hand crank mechanism connectible by flexible shaft or other means to a hand crank connection 3, the particular means for energizing the starter flywheel being immaterial to the present invention. The starter 1 may be provided with either solenoid or manual means for extending the jaw 2, the present starter being provided with both means. The solenoid means for extending the jaw is contained within the starter housing and the manual means is operable through a pull cable or the like connectible with an external lever 4 on the head of the starter. The particular means for extending the jaw 2 is likewise immaterial to the invention.

Starters having the above described features are now in common use and the present invention is incorporated in the device indicated by the numeral 5 which is designed as a test stand on which conventional starters may be readily clamped and unclamped for testing. The device 5 is contained within and supported upon a base portion 6 having base flange 7 which may be securely bolted to a test bench or other firm support. The base portion 6 carries a head 8 adapted to receive and support the starter 1 in the same manner in which it is intended to be supported by its mounting flange on an aircraft engine mounting pad. Thus, as shown in Figure 2, the starter mounting flange 9 is adapted to be clamped against the head 8 by means of a pair of easily manipulatable clamping arms 10, dowels 11 being provided on the head 8 to be received through the usual holes in the mounting flange.

Secured on the rear side of the base 6 by means of bolts 14 is a resilient torque tube 15 in alignment with the head 8. The tube 15 is welded at 16 to a smaller resilient torque tube 17 telescoped therewithin and carrying on its free end a flange 18. Bolted to the flange 18 is a sleeve 19 having splined therein a removable jaw 20 similar to the starter jaw 2 and having teeth adapted for engagement thereby. The jaw 20 is removably secured in the sleeve 19 by means of a central bolt 21 whereby different jaws may be substituted to accommodate different types of starters. The sleeve 19 is supported against lateral movement by means of a ball bearing assembly 22 carried by a part of the base 6 directly behind the head 8 in the manner shown in Figure 2.

The arrangement is such that when a starter is mounted on the head 8 the starter jaw 2 may be extended into positive engagement with the co-mating jaw 20 splined in the sleeve 19. When the starter torque is applied to the jaw 20, the sleeve 19 is free for rotation in the bearing assembly 22 to the extent of the combined torsional deflection occurring in the torque tubes 15 and 17. For recording purposes the torsional deflection of the sleeve 19 is magnified by a radial arm 23 bolted between the flange 18 and the sleeve 19 and carrying a pencil 24 at its lower extremity. Movements of the arm 23 are guided and damped by a pair of plates 25 and 26 bearing against opposite sides thereof and supported on bosses 27 and 28 on the base portion 6.

The plate 26 carries a fixed reference pencil 29 in line with the no load position of the movable pencil 24, the pencils 24 and 29 being thus arranged for making tracks or curves upon a paper tape 30 as the latter moves over a platen or platform 31. A plurality of pressure rollers 32 are retained by a spring clip 33 secured by screws 34 to hold the paper 30 flat against the platen 31 beneath the pencils. The numeral 35 designates a paper roll carried in a paper holder 36, and the numeral 37 designates a reduction gear paper drive powered by an electric motor 38.

A plurality of switches 40 are mounted exteriorly on the base 6 for energizing the starter motor, the starter jaw meshing solenoid, and the paper driving motor 38 for the coordination of these functions in proper sequence.

Figure 6:
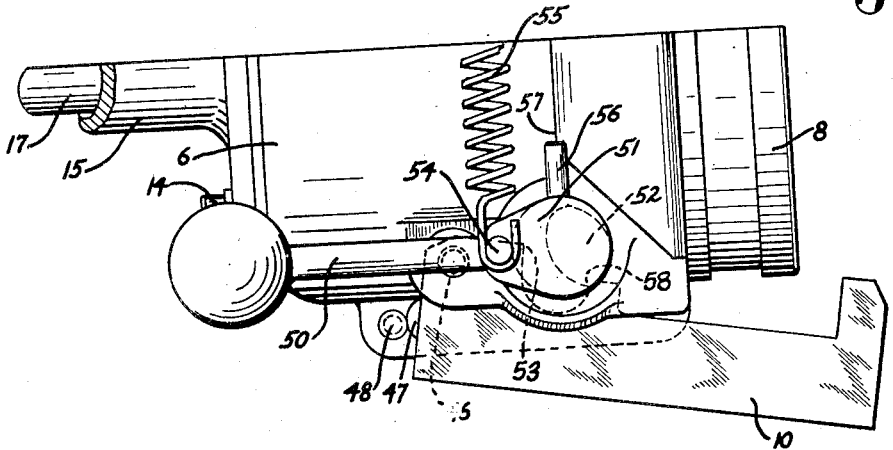
Figure 6 is a partial view similar to Figure 5 showing one of the clamps released.

Referring now to Figures 2, 5 and 6, cam means will be ~~ribed for exerting a clamping action on the clamping arms 10 to hold the starter 1 securely against the head 8 in the same manner that the starter would be supported upon an engine mounting pad. The arms 10 are provided with elongated slots 45 for loose pivotal movement about pins 46 carried by the base 6 whereby the arms may have both pivotal and longitudinal clamping movements subject to the biasing action of spring actuated balls 47 abutting pins 48 on the base 6. A pair of operating levers 50 carried by vertical shafts 51 journaled in the base 6 have cam portions 52 engageable with shoulders 53 on the arms 10 to produce longitudinal clamping movement in the arms. Pins 54 on the operating levers 50 are connected by an over-center spring 55 adapted to maintain these levers either in the clamping position shown in Figure 5 or in the release position shown in Figure 6. In the position of Figure 5 the inward motion of the levers 50 is stopped by the operation of the clamping mechanism just described, and in the position of Figure 6 the motion of the levers 50 under spring tension is stopped by the engagement of pins 56 on shafts 51 with abutments 57 on the base 6.

When the levers 50 are swung outwardly to the position shown in Figure 6, the cams 52 are rotated clear of the shoulders 53 permitting the arms 10 pivotal and longitudinal movement as shown. Shoulders 58 of arms 10 ride on cams 52 to maintain arms 10 in their outward position of Figures 6 and locked against inadvertent movement inwardly to be in their starter base clamping positions of Figures 2 and 5. To clamp the clamping arms 10 they are first swung inwardly to grasp the starter base flange and then the levers 50 are rotated inwardly toward the position shown in Figure 5. This inward motion of the levers 50 rotates the cams 52 in such a manner that the rising cam surfaces engage the shoulders 53 to move the arms 10 longitudinally into powerful engagement with the starter base flange. The slope of the cam surfaces is such that the spring 55 is adequate to maintain this clamping action as shown in Figures 2 and 5 once this position of the parts has been manually produced. The dowels 11 furnish guiding support and prevent rotation of the starter on the head 8 under torque reaction.

The above described clamping mechanism is the invention of Philip F. Scofield being claimed in application Serial No. 542,700, filed June 29, 1944, entitled "Starter test stand" and assigned to the assignee of the present invention.

As far as the starter is concerned, the operation of the present torque recorder simulates an attempted starting operation on a "frozen" engine. When the rotating starter jaw 2 is advanced into engagement with the locked jaw 20 the energy of the flywheel is dissipated in the starter clutch causing a torsional deflection of the torque tubes and a corresponding movement of the recording arm 23 to move the pencil 24 transversely across the paper tape 30. In such a simulated starting operation with the paper tape 30 travelling beneath the pencils 24 and 29, a continuous curve will be traced by the pencil 24 and the torque indicated at any point may be readily determined by measuring the distance between this curve and the straight line traced by the fixed pencil 29. Thus it is seen that the traced curve is independent of the exact alignment or position of the edge of the paper in its travel over the platen 31, the only requisite being that the paper be made to travel at a uniform speed and maintain itself in such a position that both pencil tracks remain on the paper, the track from pencil 29 serving as a reference base line throughout the length of the curve.

The outstanding characteristic of the present testing device is its frequency response whereby it faithfully follows and records extremely high frequency torque pulsations which have heretofore escaped detection in conventional testers. Known devices previously employed in testing and calibrating clutch torque and the like have been effective only to indicate the average values and have not been operative to portray a graphic picture of clutch action in terms of instantaneous torque values plotted against time. With the present device the paper speed may be adjusted by known means so that each pulsation may be measured separately in the determination of vibration frequency and amplitudes from a low frequency chatter to a high pitched vibration. This characteristic is extremely useful and necessary inasmuch as a mere average torque indication does not reveal the frictional variations which may be occurring rapidly bewteen the clutch discs. It is desired to know whether the torque is being exerted by a smooth slipping action or whether the discs alternately bind and slip.

Severe cases of chattering or vibration may be detected by the ear but it has been found in using the present device that many clutches presumed to be good by a mechanic's ear test have produced very unsatisfactory graphic records. A starter clutch is a piece of mechanism which is designed to operate only intermittently and testing procedure which attempts to parallel service conditions to determine such factors, for instance, as the ultimate life of the clutch, require long periods of time to produce failure. By coordinating a study of torque and vibration characteristics with destruction tests on sample clutches, information is obtained which is of great value in predicting the life and performance of clutches to be put in service.

The previously mentioned damping action of the plates 25 and 26 on the arm 23 is such as to make the arm faithfully follow the movements of the sleeve 19 without rendering the device unresponsive to high vibration frequencies. The stiffness of the tubes 15 and 17 is such that the natural frequency of the system is far beyond the range of vibration frequencies encountered in starter clutches whereby the system is sensitively responsive to any amplitude or frequency of clutch vibration encountered.

If desired, the outer tube 15 may be made relatively stiff and rigid so that practically the total deflection occurs in the inner tube 17. Regardless of which tube experiences the greater angular deflection, the telescoping arrangement preserves the advantage of a compact and unitary mounting for both the starter and the recording mechanism in a common housing at one end of the torque tube assembly.

It is understood that the terms stylus, pencil and marking means are used in a broad sense to include any type of scribing device capable of drawing a curve on a moving tape and the like. The type of stylus at present preferred comprises a lead or lead pencil holder having a light spring to press the marking material firmly against the moving paper, it having been found that ink recording mechanisms were unsatisfactory for high vibration frequencies. By accurately making the lead holder and carefully adjusting the spring pressure, a pencil marker will satisfactorily record extremely high frequency vibrations.

Although the dynamic recording of instantaneous values has been emphasized as the outstanding characteristic and advantage of the device, it is to be understood that it is equally well adapted for static testing, such as in a locked rotor motor test where the moving parts are all at rest, and this double utility constitutes a still further advantage of the present arrangement. In other words, such a locked rotor motor test could also be made if the jaws 2 and 20 were initially engaged and at rest while the arms 10 are clamping the starter base instead of the jaws being separated as shown in Figure 2 and only engaged after the starter operates to throw jaw 2 out into mesh with jaw 20. Also, static loading may be utilized for purposes of calibration by providing a weight on a lever arm interlocked with the jaw member 20.

Various changes may be made in the construction and arrangement and all such modifications are included in the invention, the same being limited only by the scope of the appended claims.

We claim:
1. A clutch torque recorder comprising a resilient member having one end fixed and the other end rotatably free and adapted to have a variable torque applied thereto, a radial arm carried by said member, a pair of friction plates engaging opposite sides of said arm to damp out movements thereof, a stylus carried by one of said plates, and a stylus carried by said arm.

2. A clutch torque recorder comprising a base housing, means on said housing for mounting a clutch mechanism to be tested, a torsionally resilient member having one end fixed in said housing and having the other end rotatably free and adapted for engagement by a torque delivering element in said mechanism, a radial arm carried by said member and disposed within said housing, a stylus carried by said arm, and a paper moving mechanism in said housing associated with said stylus.

3. A clutch torque recorder comprising a housing, a head on said housing adapted to receive a clutch mechanism to be tested, cam means on said housing for clamping a clutch mechanism on said head, a resilient member having one end fixed in said housing and having the other end rotatably free and adapted for engagement by a torque delivering element in said mechanism, a radial arm carried by said member within said housing, and a stylus carried by said arm.

4. A dynamic clutch torque recorder comprising a housing, a head on said housing adapted to receive an inertia starter and the like, means for clamping said starter on said head, a resilient tube fixedly mounted at one end to said housing and having a free end mounted in a bearing in said housing, a jaw secured to said free end so as to be engageable by a jaw in said starter, a radial arm rotatable by said jaw, and a stylus carried by said arm.

5. A dynamic clutch torque recorder comprising a housing, a head on said housing adapted to receive an inertia starter and the like, means for clamping said starter on said head, a resilient tube fixedly supported at one end by said housing, a second resilient tube within said first tube and fixed thereto at the other end thereof, a bearing in said housing, a jaw secured to the free end of said second tube and mounted in said bearing for engagement by a jaw in said starter, a radial arm movable by said jaw, and a stylus carried by said arm.

6. In a dynamic clutch torque recorder, a housing, a head on said housing adapted to receive an inertia starter and the like, means for clamping said starter on said head, a bearing in said housing, a torsionally resilient sleeve having one end fixedly mounted to said housing and the other end rotatably mounted in said bearing, a jaw removably secured in said sleeve for engagement by a jaw in said starter, a radial arm carried by said sleeve, and a stylus carried by said arm.

7. In a dynamic clutch torque recorder, a housing, a head on said housing adapted to receive an inertia starter and the like having an extendable jaw, means for clamping said starter on said head, a bearing in said housing, a torsionally resilient sleeve having one end fixedly mounted to said housing and the other end rotatably mounted in said bearing, splined grooves in said sleeve, a jaw similar to said extendable starter jaw carried in said grooves, means to removably secure said jaw in said sleeve, a radial arm carried by said sleeve, and a stylus carried by said arm.

8. A dynamic clutch torque recorder comprising a housing, a head on said housing adapted to receive an inertia starter or the like having an extendable jaw, a pair of clamping arms adapted to engage a base flange on said starter, manipulatable means for binding said arms into firm clamping engagement with a base flange on said starter to hold said starter rigidly on said head, a resilient tube fixedly mounted at one end on said housing, a second resilient tube within said first tube and having one end fixedly united with the free end thereof, a flange on the free end of said second tube, a flanged sleeve secured to said flange, a bearing in said housing carrying said sleeve, a jaw splined in said sleeve for engagement with said extendable starter jaw, a radial arm carried by said flanges, a stylus carried by said arm, damping means for said arm, a fixed stylus carried by said damping means, and means for moving a paper tape in operative relation with said styluses.

LYSLE D. CAHILL.
JOSEPH J. NEFF.
FORREST A. FRAMPTON.